E. T. FERNGREN.
METHOD OF FEEDING GLASS TO MOLDS.
APPLICATION FILED JAN. 7, 1913.
1,196,848.
Patented Sept. 5, 1916.
5 SHEETS—SHEET 2.
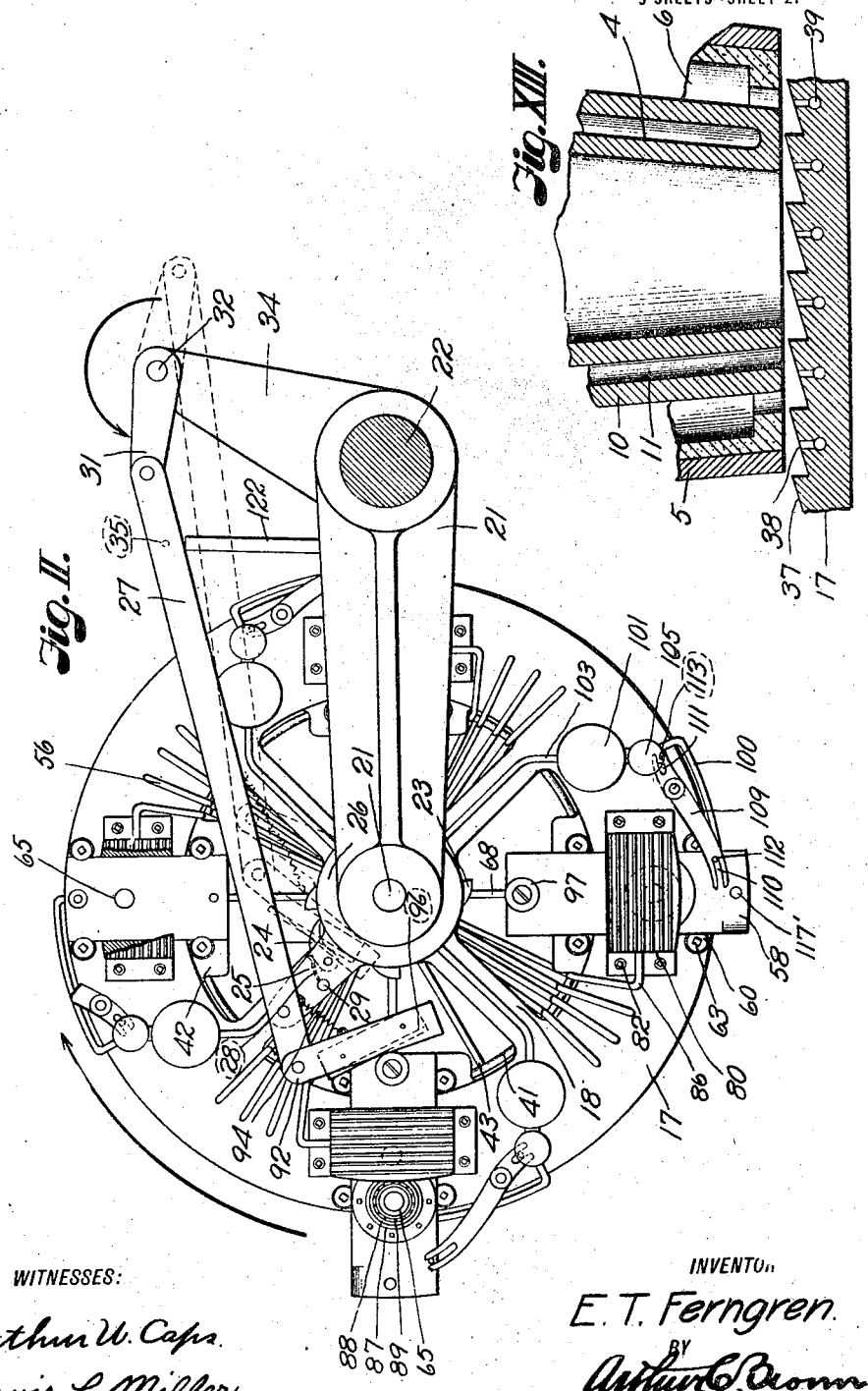
WITNESSES:
Arthur W. Caps.
Lewis L. Miller.
INVENTOR
E. T. Ferngren.
BY
Arthur C. Brown
ATTORNEY E. T. FERNGREN.
METHOD OF FEEDING GLASS TO MOLDS.
APPLICATION FILED JAN. 7, 1913.
1,196,848.
Patented Sept. 5, 1916.
5 SHEETS—SHEET 3.
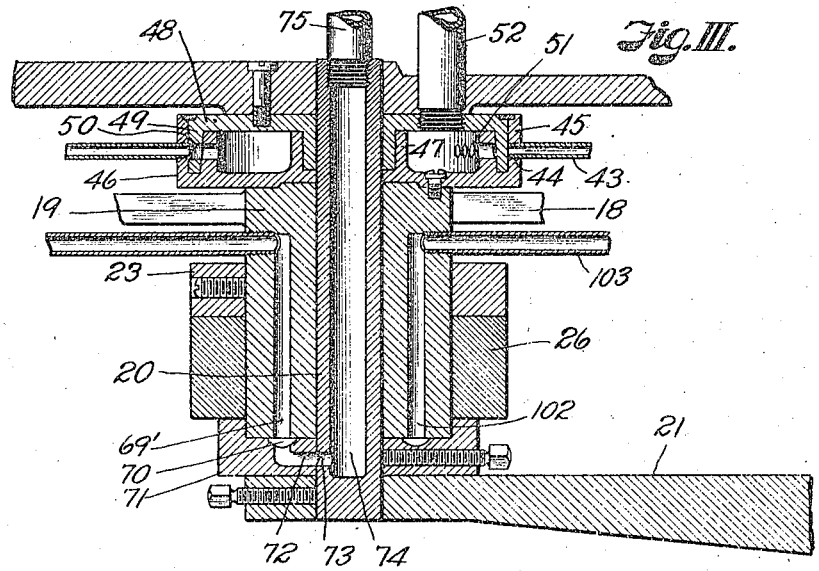
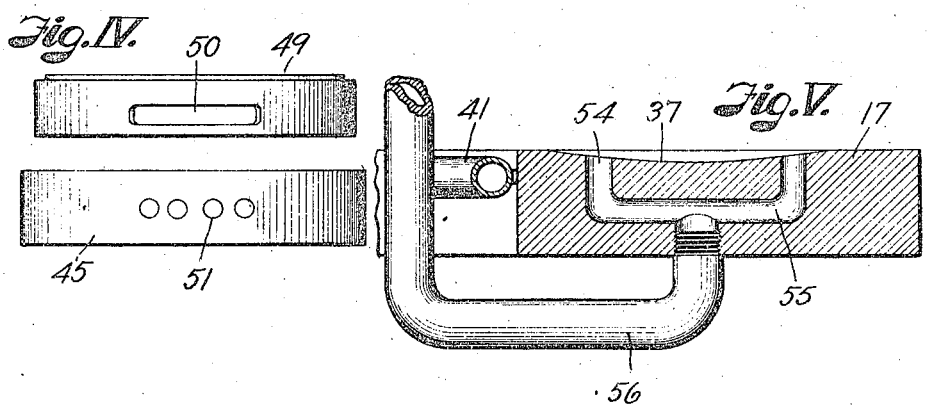
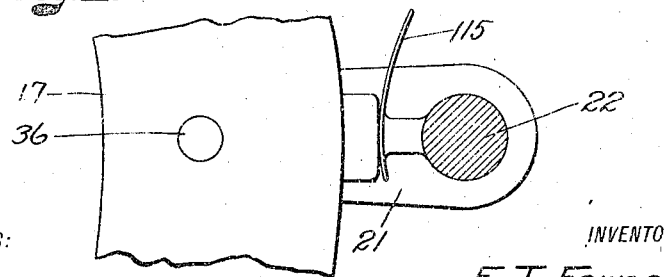
WITNESSES:
Arthur W. Caps.
Lewis L. Mills
INVENTOR
E. T. Ferngren.
BY
Arthur S. Brown
ATTORNEY E. T. FERNGREN.
METHOD OF FEEDING GLASS TO MOLDS.
APPLICATION FILED JAN. 7, 1913.
1,196,848.
Patented Sept. 5, 1916.
5 SHEETS—SHEET 4.
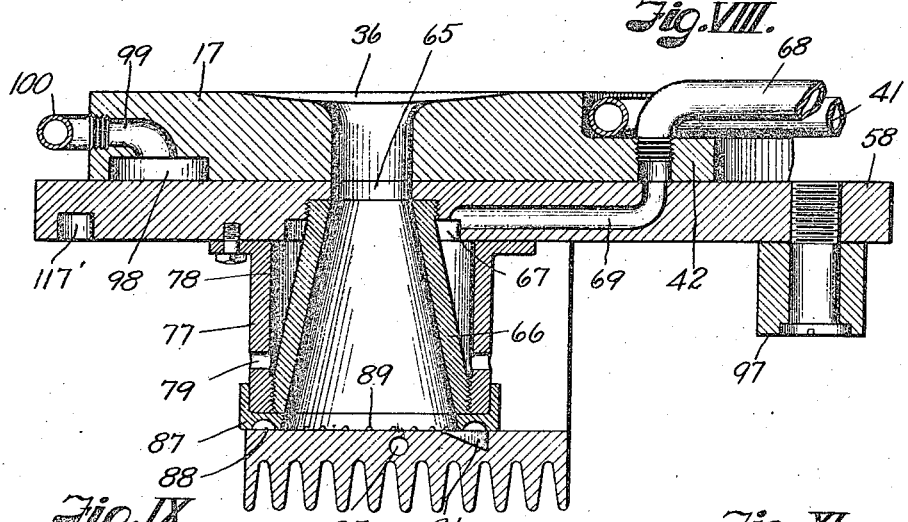
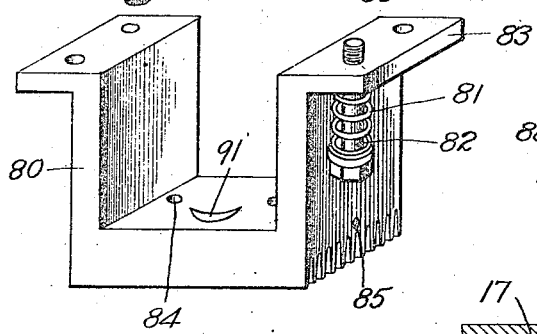
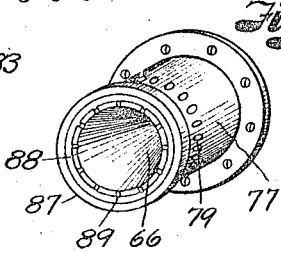
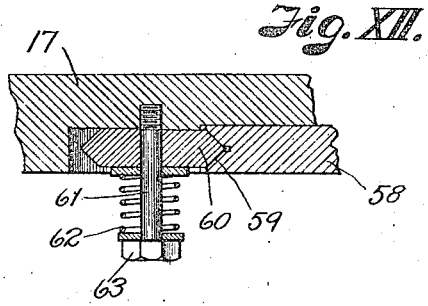
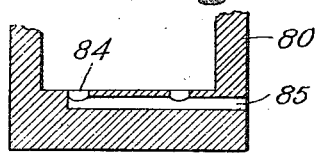
WITNESSES:
Arthur W. Capis.
Lewis L. Miller.
INVENTOR
E. T. Ferngren
BY
Arthur C. Brown
ATTORNEY

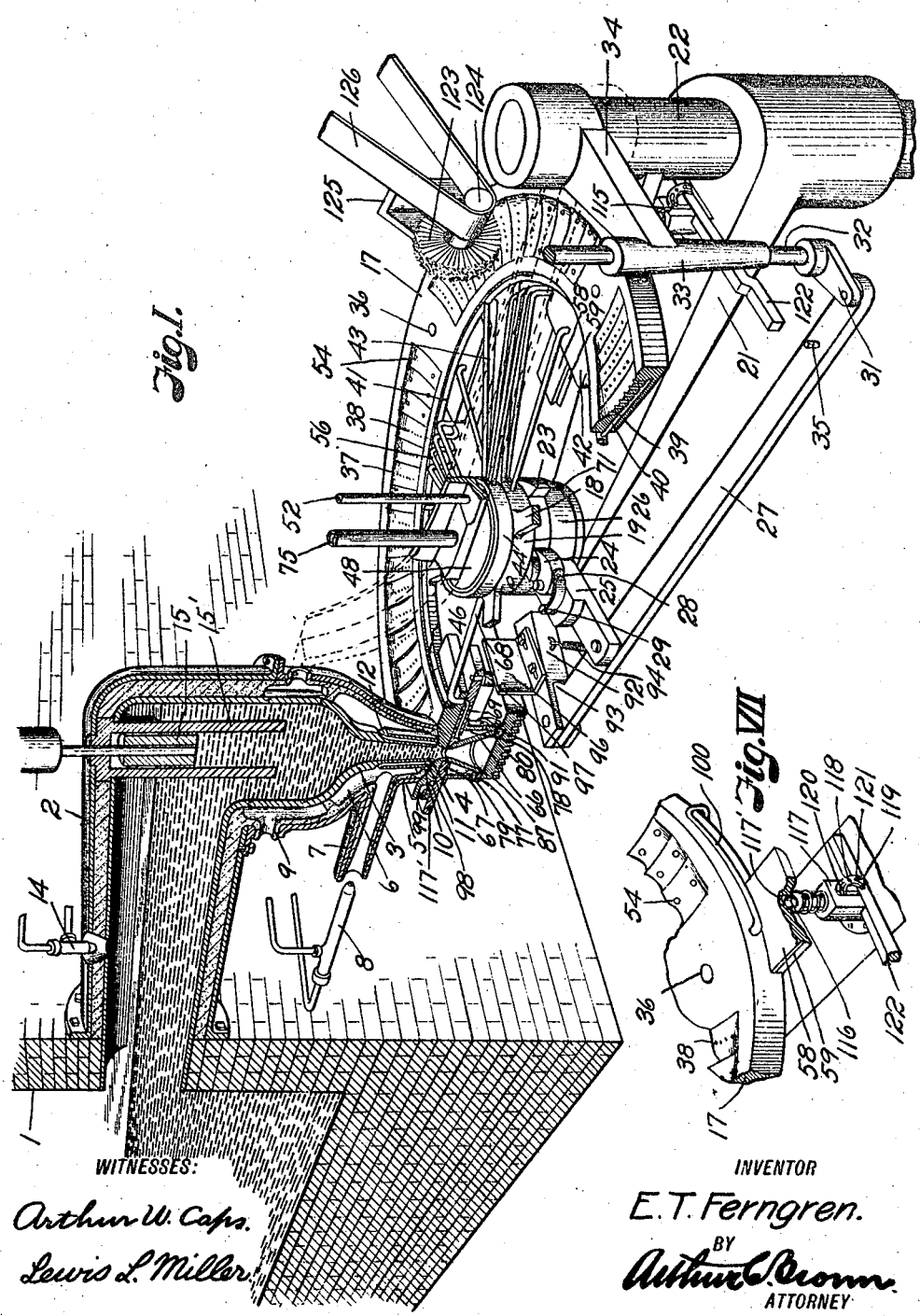

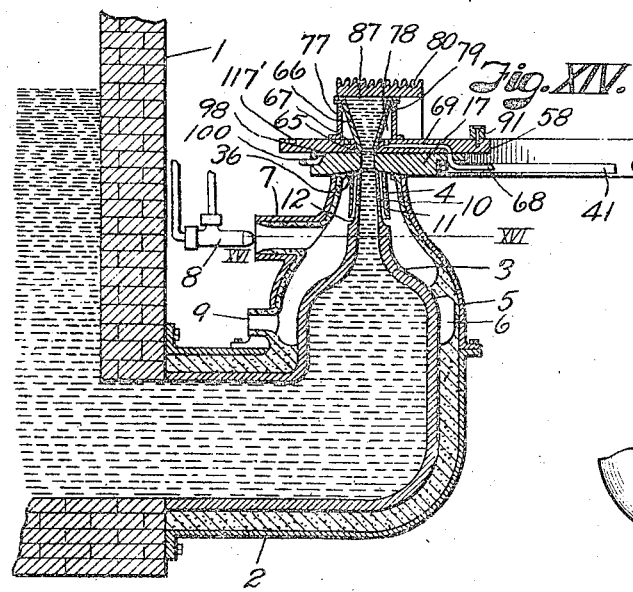
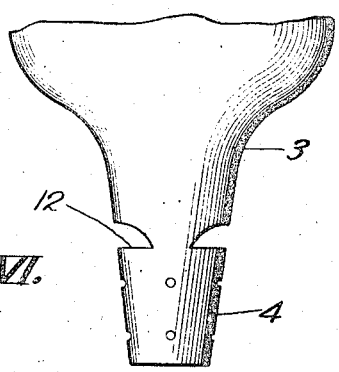
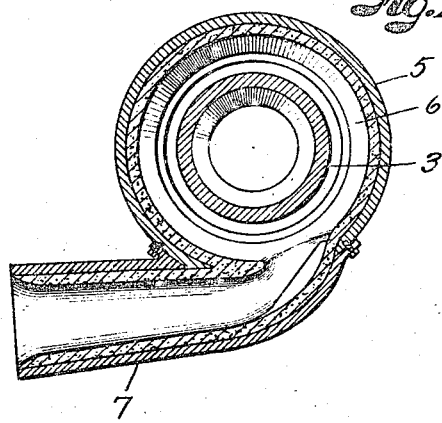
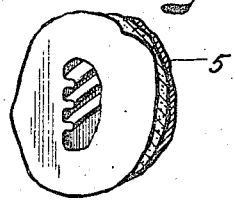

ance, which, confined air would offer to
UNITED STATES PATENT OFFICE.

ENOCH TH. FERNGREN, OF KANSAS CITY, MISSOURI.

METHOD OF FEEDING GLASS TO MOLDS.

1,196,848.  Specification of Letters Patent.  Patented Sept. 5, 1916.

Application filed January 7, 1913. Serial No. 740,631.

*To all whom it may concern:*

Be it known that I, ENOCH T. FERNGREN, a citizen of Sweden, residing at Kansas City, in the county of Jackson and State of Missouri, have invented certain new and useful Improvements in Methods of Feeding Glass to Molds; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a method of feeding molten glass and has particular reference to the manufacture of blown or pressed glassware, in the manufacture of which it is desirable that glass be conducted in a molten state from a furnace to blank, blow or press molds and then formed into finished articles.

Among the various objects to be fulfilled by the hereindescribed method of feeding glass, are the production of as free and unresisted a flow of molten glass, through a given flow opening to a measuring mold, as is practical; that is, a flow, in which the skin frictional resistance of the superimposed mass of glass, in contact with the walls of the flow conduit, leading to the said flow opening, is to a great extent eliminated.

Another object is to produce, what might be termed, a volume flow of molten glass, from said flow opening; a flow which will be nearly cylindrical in form, or having a similar or nearly equal section to that of the flow opening as it leaves the said flow opening. The usual form of flow, found in practice, is a rapidly converging one, that becomes string-like, a short distance from the flow opening, necessitating an accumulative gathering of glass to fill the mold; producing a slow filling, resulting in uneven congealing, during the gathering of the glass. By the cylindrical or prismatic like form of volume flow, we are enabled to almost instantaneously fill a measuring mold with molten glass. But, a further object is involved in modifying the volume flow, and this is, the acceleration of the volume flow, by an impulse agency, which, while not, in any manner, obstructing or operating in the space occupied by the flowing glass, in the immediate vicinity of the flow opening, causes a thrusting current within the glass toward the said flow opening, in the line of its gravity flow, downward or hydrostatically upward, as the case may be.

Another object is to modify the volume flow, as it enters an adjacent port of a receiver or measuring mold, in a manner to completely fill said port and to produce a plastic surface, to make effective, upon the inflowing body of glass, a suctional action, operative from within the cavity of the said receiver. The object of the suctional action is two fold, firstly, to eliminate the resistance, which, confined air would offer to the glass flowing into the receiver and, secondly, to make more effective, the combination of forces propelling the glass entering the mold, especially when the impulse agencies are made active simultaneously with the suction, so that there will be produced a bulging or swelling of the glass, as it flows into the mold, to fill the same, which will in effect be similar to that of blowing glass with air, to distend an envelop of glass into contact with the walls of a mold cavity, but in this case, the glass itself is the agency of the distending force, so that the envelop of glass will, when in contact with the walls of the said receiver, have been distended and filled with glass instead of air. In thus filling the measuring mold, I desire to produce a fixed and uniformly distributed skin congealing effect upon the gathered glass and also produce an instantaneously filling volume charge of glass, free from the defects associated with accumulative flow gathering, as well as from defects associated with suctional gathering into a mold from a surface of molten glass, whereby the glass entering and arising into the cavity of the mold, is progressively chilled and congealed in contact with the walls of the cavity of the mold, leaving the central portion the hottest and most fluidic, which results in a blank of glass having a variably congealed structure, its top most portion being last to congeal.

A further object of the hereindescribed method is to so portion off the glass, after it has filled the said measuring mold, that the congealing effect attending the severing action, will not be transferred back into the flow opening, while shearing the glass at a point adjacent to, but not at said flow opening; whereby is avoided the congealing effect attending the severing action in the eclipsing of contacting ports, or by other means in contact with a flow opening, in which action, a surface of some kind wipes over the glass in the end of a flow opening, closing the same and absorbing heat from the glass, resulting in a partial cooling and solidifying effect upon the glass in the flow opening, making the same unfit for subsequent formative use. Such objectionable severing action has made inoperative, several devices designed to use such means for portioning off the glass.

A further object is to keep the glass issuing continuously from the flow opening; however, under certain conditions.

A further object is to vary the velocity of flow. By keeping the glass flowing, my object is to prevent stagnation of both the flow in the flow opening and the movement of glass in the conduit leading to said flow opening, and thus insure a constantly available fresh supply of high temperatured molten glass, in a liquid state, for feeding successively positioned measuring or other molds to be filled.

A further object of this method is to support, retard and remove the glass continuously flowing through the flow opening, either against gravity, or against hydrostatic pressure, for the purpose of preventing an excessive amount of glass being carried off in between the times of filling successive molds, as the glass continues to flow from said flow opening. Under the condition of filling measuring molds, in very rapid succession, there would be no waste glass to carry off, except that left over from each severing action, that is the waste glass which lies over the severing port or the shearing means. In the latter case, nearly the whole flow of molten glass from the said flow opening would be used for formative purposes.

Another object of this method is to effect a forcible ejection of the glass from the measuring mold, as quickly after the severing action, as is practical; and having the position of the glass for this ejection action, as little removed from that which it had for the severing action, as is possible.

A further object is the formation of a rounded blank of glass, which shape is to be created during the passage of said blank from the measuring mold to the forming mold, by means of the ejecting force in impelling the same, which, when transferred to said blank and said blank is free from said measuring mold will result in an equalization of temperature throughout the body of the rounded glass, which will dissipate the surface congealing, imparted to the glass, during its previous occupancy in said measuring mold. We thus insure a highly plastic blank body of glass for further formative purposes. To fulfil the above object, certain apparatus is required to carry out the steps in my method. However, the method is not confined to any particular apparatus. Any device adapted to perform functions required for effecting the glass in accordance with my method or modification thereof, may be used.

Beginning with the molten glass in the melting tank, by my method, the glass is led to a suitable conduit, preferably one that is funnel shaped, terminating in a flow opening. To reduce the skin friction between the superimposed mass of molten glass in said conduit, near said flow opening, I superheat the small end of said conduit in such a manner as to cause the glass in contact with the inner walls of said conduit, in the region of the supply opening, to become more liquid and act as a lubricant to the superimposed mass in said conduit, thus eliminating the causes of a string flow, attending methods now in common use for charging molds and obtaining instead, a practically free and rapid flow, which will cause the glass to issue in cylinder like volume, having a cross-section nearly equivalent in form and area to that of the flow opening, which makes possible the regulation of flow by size of opening.

Having thus produced a comparatively thick flow of glass from a relatively small opening, I maintain a superheated atmosphere about the glass in the vicinity of the said opening and allow this glass to come in contact with a port to a receptacle closely spaced from said flow opening, in the manner to completely cover said port. To completely seal said port with the flowing glass, I have the port walls convergent toward the cavity of the measuring mold or receptacle, and in addition, I preferably have the outer surface surrounding the port, dished or pocketed, thus affording a partial support to the glass coming from said flow opening and by so sealing the port, I make effective a suctional action, operative from within the cavity of said receptacle. During the passage of glass, burning gases are drawn down around the passage or nozzle and beyond the flow opening into apertures in a receiving surface, surrounding the port in said receptacle so as to insure a constant supply of heat units for the flowing glass. The effect of the contact of the flowing volume of glass with the converging walls of said port is to partially chill the same and make the contacted surface layer of glass plastic, as it enters the cavity of said receptacle, so that the effect of the suctional action is, not only to eliminate air from the said cavity, that would otherwise obstruct the filling of said cavity with glass, but to cause the forces, acting upon the inflowing glass, to bulge the same, as if blown, and make it swell to fill the mold. This action is important, inasmuch as, by reason of the supporting effect given to the outer plastic layer of the inflowing glass, by the walls of said port, the impelling forces co-act with the surface tension of said plastic layer and the glass takes on a pear shape, which immediately grows to completely fill the cavity of the receiver, which should for best results, somewhat resemble the natural shape taken by the glass in the cavity of the mold, as it grows to fill the same, in response to force conditions acting upon it. The walls of the receiver are jacketed by a cooling medium to prevent the sticking of the glass to the walls of the cavity thereof, which walls are made of the usual material for the purpose. The almost instantaneous filling of a mold, in such a manner, results in a simultaneous contact with the lower temperatured walls thereof, by all parts of the surface of the glass filling mold, so that any surface congealing will be uniform throughout, which is important in preparing a blank of glass for subsequent formative purposes.

To hasten the mold filling operation, or to force the molten glass under conditions which tend to restrict or retard the flow to a mold, I create a thrusting current in the glass, toward the flow opening. This thrusting current is created by impulse means positioned and operated in the body of glass at a point away from the flow opening. The said impulse means is surrounded by glass in the conduit where the velocity of flow is small and the surrounding body of glass comparatively large. The current produced by the action of said impulse means is directed into the path of the flowing glass, immediately in advance of the flow opening, where the velocity of flow is great, but is made greater by the effect of this induced current being added to it before it leaves the flow opening. By having the impulse means thus positioned out of the path of the faster flowing glass, no material congealing effect can take place upon the glass immediately forward of the flow opening, by direct contact with the said impulse means. By reversing the movement of the impulse means, glass in the conduit is drawn up into the same, with the effect of partially diverting the flow and suspending for an instant, the issuance of glass from the flow opening. Such an effect will be found useful in suspending the flow in between the times of filling molds.

After completely filling the measuring mold, it is moved out of register with the flow opening, and away from the base covering surface, which formed the bottom to the mold during the filling operation, and it next registers with ejecting means, such as one using compressed air, at a short distance from where the mold received its filling charge, in which new position, the blank of glass is forcibly ejected from the now bottomless mold, and thus will be lost as little time, as possible, in the transfer of the glass for further formative purposes.

The force imparted to the glass, as it is ejected from the measuring mold, is distributed through the freed blank and co-acting with the surface tension forces of the said blank, results in rounding the same so that all points of the surface thereof are made nearly equi-distant from the center, which is the hottest, and from which the heat radiates and becomes uniformly distributed throughout the rounded blank. The forcibly ejected blank is next received by a forming mold, wherein the forcible entrance of the said blank facilitates the conforming of the glass to the shape of the mold cavity, if so desired.

The above described method can be carried out, for a given set of conditions, in an apparatus, such as that below described and illustrated in the drawings. A modification of such an apparatus, as well as other devices, can be used when adapted to functions, in carrying out my method, or steps thereof, for particular purposes.

In the drawings: Figure I is a perspective view of one form of apparatus constructed to carry out my invention, under a given set of conditions. Fig. I$^T$ is a bottom plan view of the same, the furnace being omitted. Fig. III is a vertical sectional view of the hub of the skimming wheel, the vacuum distributing valve and the compressed air connections. Fig. IV is a sectional view of the vacuum valve. Fig. V is a sectional view of the rim of the skimming wheel, showing the vacuum connections. Fig. VI is a plan view of the device for resetting the cut-off member. Fig. VII is a perspective view of the wheel locking device. Fig. VIII is a sectional view through the rim of the skimming wheel and cup, showing the cut-off valve and air passages, and the shallow pocketed shape of the entrance to the feed port. Fig. IX is a perspective view of a yoke for the cut-off-valve. Fig. X is a sectional view of the lower portion of the same. Fig. XI is a bottom perspective view of the cup. Fig. XII is a detail view of one of the cut-off valve rollers. Fig. XIII is an enlarged sectional view of the lower end of the delivery nozzle, taken parallel to the plane of rotation of the skimming wheel. Fig. XIV is a sectional view of a modified form of the machine, showing a hydrostatic under feed. Fig. XV is an elevation of the lower end of the delivery nozzle, showing a modified form of draft intake. Fig. XVI is a sectional view on the line XVI—XVI, Fig. XIV, showing a modified mechanism for delivering flame to the nozzle. Fig. XVII is a perspective view of the interior of the modified form of flame delivery conduit.

Referring more in detail to the drawings: 1 designates a furnace of any suitable type, and 2 a conduit through which molten glass is withdrawn from the furnace, the outer end of the conduit being provided with a nozzle 3 and which combination may also be as shown in Fig. XIV may be down or upturned according to whether the molten glass is fed by gravity or hydrostatic pressure, and which has a contracted delivery nipple 4.

The nozzle 3 has a jacket 5 spaced therefrom to form a heating chamber 6 and is provided with a conduit 7 through which flame from a compressed air and gas burner 8 is delivered to the heating chamber 6 to flow down around and envelope the nozzle and nipple, being drawn down and through the jacketed spaces around the nipple by means of suction from apertures in the surface adjacent the open ends of said jacketed spaces, below described in detail; to heat these parts, in order that the molten glass may be kept at a proper temperature and condition for flowing through the nipple port, or flow opening, and whereby is established a lubricating effect by making more fluidic, the glass immediately in contact with the walls of the nozzle 3, thus eliminating to a great extent the skin frictional resistance of glass which exists in a passage not heated in this manner. Exit ports 9 are provided in the upper portion of the jacket 5, through which gases from the chamber may be exhausted.

Surrounding the nipple 4 is an inner jacket 10, forming an annular chamber 11 around the lower portion of the nipple 4 and having a mouth 12 near the top, through which a flame from the conduit 7 may enter, to pass in close contact with the nipple body, thereby localizing a high temperatured effect in close proximity to the flowing glass, immediately before its issuance from the flow opening; the lower rear portion of the chamber being closed (see Fig. XIII) so, that, molten glass carried under it by the skimmer (which will presently be described), may not enter the chamber 11 to clog the same, the remaining lower front portion of said chamber 11 being open to guide the flame below the feeding conduit all of the lower portion of the main nozzle chamber 6 being open to guide the flame to completely surround the glass, as it issues from the flow opening.

In order to maintain molten glass in the conduit at a proper temperature, and in a flowing state, I provide an auxiliary heater 14, comprising a burner adapted for delivering flame into the conduit above the level of the fluid, so that heat is applied directly thereto. In order to effect a quick delivery of the fluid from the nozzle 3, I induce an accelerating current in the glass flowing toward nipple 4, by means of a plunger 15 (see Fig. 1) when moving toward the nipple 4, in an inverted well 15'.

The plunger 15 and well 15' are located in the larger upper part of the nozzle 3 and are surrounded by molten glass. The current produced by the ejection of glass from within the inverted well 15', by the plunger 15, increases the speed of flow of glass through the nipple 4, at the time of filling a measuring mold. In the interval of time elapsing between the filling of successive molds, the plunger 15 is moved upward, drawing glass into the inverted well 15', resulting in a suspension or limitation of flow from the nipple 4, according to the speed of the plunger 15. If we combine with this impulse action, a suctional action, operative from within the cavity of the measuring mold, while the same is in position to receive the charge, we will produce a very rapid movement of glass through the superheated nozzle 4. Means adapted for bringing about this suctional action are below described.

The apparatus for receiving molten glass from the delivery nozzle comprises a revoluble table 17, which preferably comprises a ring-shaped structure supported by spokes 18, from a hub 19, that is revolubly mounted on a shaft 20, supported on and fixed to an arm 21, on a stationary standard 22. The hub 19 has a rack 23 on its periphery adapted for engagement by a pawl 24, which is pivotally mounted on an arm 25, fixed on a collar 26, that is revolubly mounted on the hub 19, one end of said arm being pivotally connected with a lever 27, whereby the pawl is actuated at regular intervals to forward the table 17, the pawl 24 being yieldingly tensioned toward its rack by a spring 28, which engages one edge thereof and is carried by a curved pin 29, that is fixed on the top of the arm 25.

The lever 27 is pivotally connected with a crank 31, on a shaft 32, that is journaled in a bearing 33 on an arm 34 of the standard 22 and is operated by any suitable mechanism (not shown), the lever being provided adjacent the crank with a pin 35 for tripping a table lock and at its outer end with means for shifting the measuring mold, as will presently be more fully described.

The table 17 has a circular trough surface adapted for travel immediately beneath the discharge end of the feeding nozzle 3, and has a determined number of pocketed feed ports 36, spaced with reference to the forwarding ratchet, so that each operation of the table will bring one of the pocketed feed ports 36, directly beneath the feed port of the nozzle 3 in which position, the table is locked, so that it is held in feeding position, a sufficient length of time for the proper amount of molten glass to pass through the receiving port into a measuring cup, and partially spread out in the pocketed portion of the port 36, to facilitate the continuous issuance of molten glass from the feed nipple 4, the trough surface of the table is provided with skimming cups 37, which travel beneath the nozzle port, while the table is in motion, in order to continuously remove the molten glass from the bottom of the nipple and thereby maintain a continuous flow of the fluid in a proper or desired state or condition. The flow of burning gases, about the nipple 4 to the skimmer, is drawn downward by suction, into apertures 38, in the cup flanges, which connect with bores 39, that extend through the lower portion of the table 17 and have nipples 40, of a feed pipe 41, connected therewith. The pipe 41 is extended around the inner periphery of the table and supported on a shoulder 42, which extends inwardly from said periphery, so that the same feed pipe connects with all of the skimming cups, the pipe in turn having a conduit 43, leading to and extending through the outer member 44, of the flange 45, of an air receiver 46, comprising a member 47, which is fixed to and revoluble with the table hub and with which the flange 45 is integral. A stationary member 48 has a lip 49, depending between the members of the flange 45, to form a tight joint. The depending lip 49, has an elongated slot 50, (Fig. IV) for each of the table receiving ports, and the inner member of the flange 45 has a plurality of apertures 51, adapted for communication with the slot 50, and through the slot with the supply pipe 43.

The air receiver connects with a pipe 52, which leads to a suitable apparatus for creating a vacuum. The arrangement of all of the parts is such, that as the skimmer cups pass beneath the feeding nozzle, communication is established between the cup apertures and the air receiver 46, so that suction through the cup apertures will cause the gases to adhere to the skimmer and make certain the carrying off of the glass, as it issues from the nipple 4, during the rapid swing of the cupped, skimming surface thereunder. It is also apparent that, as the skimmer cups pass beneath the feeding nozzle, the apertures 38 communicate with the lower open ends of the heating chambers 6 and 11, so that a down draft is created through the lower ends of said chambers to draw the flame around the surface of the nozzle 4 and increase the heat thereof, in order to maintain a high temperature about the flowing glass to have it issue in the proper molten condition.

In order to further insure the high temperature and molten condition of the glass at the time of delivery to the receiving port 36 in the table 17 I provide the skimming cups, immediately in advance of the ports, with apertures 54, which are spaced to avoid or clear the delivery port of the nozzle 4 yet communicate with the heating chambers 6 and 11 therein, so that as the table 17 moves below the nozzle 3, suction through the apertures 54, the bore 55, with which the apertures communicate, and pipe 56, which connects the bore 55 with the air receiver 46, will suck flame from the heating chambers 6 and 11 into the skimmer apertures and induce a strong draft, that will materially increase the temperature in the heating chambers 6 and 11 and, consequently, that of the molten glass within the nozzle, and maintain the high temperature by reason of the supply of heat units being kept up by the passing flames, as these heat units are absorbed into the glass passing to the measuring mold, thereby increasing the fluidity of the molten glass and insuring the delivery of an ample supply of very fluidic glass, in a rapid manner to the measuring mold.

Referring now to the receiving apparatus in the table 17, 58 designates slide valves, one of which is mounted transversely beneath each port 36 in the table 17 and has V-shaped grooves 59, within which the V-shaped rollers 60 are engaged for smooth and easy movement of the valves, said rollers being preferably mounted on stub shafts 61, carried by the table and yieldingly supported in functional position by springs 62, which are carried by the shaft heads 63.

Each of the slide valves has an aperture 65, adapted to register with its table port 36, and has a measuring mold 66, suspended therefrom, with the receiving opening, in registration with the aperture 65, the portion of the valve around the measuring mold being channeled, to provide an annular recess 67, having communication with a feed pipe 68, through a bore 69, in the valve body; the feed pipe 68 in turn, communicating with a bore 69', in the table hub 19.

The hub bore 69' communicates with an annular trough 70, in a collar 71, fixed to the shaft 20, so that the bore will have constant communication with the trough 70 while the table 17 is in rotation, and the trough 70 in turn communicates with a bore 72, in the collar, that leads to and registers with a port 73, in the shaft 20, which in turn communicates with a central bore 74, in said shaft and carries a supply pipe 75, which leads to and is fed from a compressor, so that a constant supply of compressed air may be delivered to the annular channel 67, in the slide valve 58 in order that a cooling blast may be delivered around the measuring mold, so that it will be kept at a lower temperature than the glass to prevent the glass from sticking to the inner walls of the measuring mold and thereby interfering with its discharge from the measuring mold to the forming mold.

In order to confine the cooling blast around the measuring mold, I provide the drum 77, which is suspended from the slide valve and connected with the lower end of the measuring mold to form an inclosed chamber 78 and has outlets 79, through which the cooling blast may escape.

The measuring mold is mounted in a yoke 80, which is yieldingly suspended from the bottom of the table 17, preferably being supported on springs 81, carried by the stud bolts 82, which extend through apertures in the yoke flanges 83, into the bottom of the table; the lower portion of said yoke having apertures 84, opening through its upper face and communicating with the bore 85, which is connected with the air receiver by a conduit.

Fixed on the bottom of the measuring mold, and adapted for sliding travel on the base of the yoke 80, is a ring 87, having an annular groove 88, in its under face, adapted for communication with the base apertures 84 and having notches 89 in the lower edge of its inner bearing surface communicating with the interior of the measuring mold so that when the receiver is in functional position, suction is created within the measuring mold to eliminate air from the cavity thereof, that would otherwise obstruct the filling of said cavity with glass, and to bring about a condition of forces that will act upon the inflowing glass to bulge the same, as if blown by air, and make it swell to fill the mold. During the filling of this mold there obtains from the walls of the port of this measuring mold, a supporting effect to the outer plastic layer of the inflowing glass, so that the impelling forces co-act with the surface tension of said plastic layer, as the glass takes on a pear shape. For this reason, the mold cavity is designed having a truncated cone shape, which the glass, as it grows to fill the mold, quite naturally develops to, in response to the forces acting upon it. An almost instantaneous filling, in such a manner, results in a simultaneous contacting with the walls of the measuring mold, whereby all of the surface of the glass filling the mold, comes simultaneously in contact with the walls of said measuring mold and the surface congealing is uniform throughout.

When the forcing action of plunger 15 is added to the gravity of the glass during the discharging of glass to the measuring mold, an accurate control of the quantity of glass discharging as well as a more positive filling is effected, and upon the return stroke of the plunger upwardly within the inverted well 15', the fluid discharge of glass from the mouth of the nozzle is reduced to a flowing string which is contiguous with the glass in the mold port above the measuring mold. Under high temperature conditions, a dribbling flow of glass from the nipple or mouth of the nozzle follows the reversing of the plunger in the glass above the nozzle after the mass discharge into the measuring mold.

In order to assist in drawing in the charge I provide the base of the yoke with a crescent-shaped pocket 91, which is beveled upward from its outer to its inner edge and is adapted for communication, at its ends, with the interior of the chamber, and at its base with the annular groove 88, so that the suction acts in the chamber, at a point between the apertures 84.

Inasmuch as the molten glass comes in contact with the base of the yoke and is moved thereover, the said base becomes very hot, and in order to cool same sufficiently to prevent the glass from sticking thereto, I web the lower portion of the base to provide a greater radiating surface. After a measured charge of molten glass has filled the measuring mold the flow of glass is cut off by the slide valve 58 and the measuring mold simultaneously moved out of the yoke to a delivery position in the following manner: Pivotally mounted on the end of the lever 27, is a block 92, which is yieldingly held backwardly against a boss 93, on said lever by means of a spring 94, but is adapted for outward actuation against the tension of its spring when moved against the pawl arm 25, as the lever 27, is rocked toward the standard 22, by the actuation of the crank 25, so that an adjustable plate 96, that is mounted on said block, is moved against a roller 97, on the end of the slide valve to move the latter transversely to cut off the flow of fluid to the measuring mold and move the same off of its base to delivery position.

As the measuring mold reaches a position over the shaping mold (not shown), the aperture 65, in the slide valve 58 assumes a position beneath a cavity 98, in the lower face of the table, which is in communication through a bore 99, with a pipe 100, which communicates with a storage chamber 101, carried on the bottom of the table and connected with a bore 102, in the hub 19, by a pipe 103, the hub bore communicating with the supply groove 70, in the collar 71, and through the bore 72, and standard conduits with the compressor.

A valve 105, is located in the pipe 100, between the storage chamber and the table cavity 98, so that air is admitted to the cavity and discharged into the measuring mold as the mold moves over the shaping mold to discharge the fluid from the measuring mold to the shaping mold. The valve 105 is actuated by a lever 109, which is pivotally mounted on the under face of the table and has grooves 110—111 in its opposite ends straddling pins 112 and 113, on the air valve and slide valve respectively, so that when the slide valve reaches a predetermined position after severing with the intake port 36 the air valve is opened and air, under pressure is delivered against the molten glass in the measuring mold to force said glass out of the cup and into the shaping mold. The force thus suddenly imparted to the glass in the measuring mold, to eject it therefrom, becomes so distributed in the mass as to co-act with the surface tension forces in the plastic skin layer of the mass, so that its shape immediately becomes rounded, the instant the mass is free, resulting in an even distribution of heat, to make the mass homogeneous in structure, before its entry into the shaping mold.

The slide valve is returned to initial position by a curved plate 115, which is carried by the standard 22, and wipes the outer end of the slide, as the latter approaches the said standard.

The locking of the table is effected by a post 116, which is adapted for vertical movement in a bearing bracket 117, on the arm 21, which carries the table parts and is yieldingly tensioned upwardly, so that it is projected automatically into a socket 117' in the bottom of the outer end of the slide valve, when the latter moves thereover to hold the table firmly in position, during the feeding operation. The pin is disengaged from the table by means of a trip 118, which is pivotally mounted on the bracket and has curved slots 119, in its opposite ends, straddling pins 120 and 121, on the locking post and a slide bar 122, respectively.

The slide bar 122 is actuated by the pin 35 on the lever arm 27, as the latter is actuated to shift the slide valve beneath the feeding nozzle 3 so that the table may be released after each feeding operation.

As the glass which collects on the skimmer, congeals and is carried away from the feed nozzle means are required for brushing the same from the trough, said means preferably comprising a brush 123, which is mounted on a shaft 124, that is revolubly mounted in a bracket 125, and may be driven by a belt 126, by any suitable means, so that while the table revolves in a horizontal plane the brush will revolve vertically above the table in contact with the congealed glass and will remove the same from the skimmer cups.

While I have described the method as applied to a gravity feed, it is apparent that the arrangement of some of the parts may be reversed, as illustrated in Fig. XIV, to utilize hydrostatic pressure for delivering from the nozzle 3, The superheating blast may be delivered tangentially to the nozzle to produce a gyratory effect, and that by grooving.

In the general description of my method given above, and its specific application, in connection with the apparatus herein described and illustrated, I have endeavored to show the application of the said method to the manufacture of glass articles, wherein certain conditions require the successive performance of all the steps in said method above referred to.

To recapitulate, the successive steps, as previously described, in the method involved, start with the molten glass in a melting tank flowing to a superheated nozzle, and beyond same, the glass being heated on its way to the nozzle, to increase the fluidic condition of the glass, before reaching the superheated nozzle where a lubricating effect is obtained, causing a volume flow, which is nearly cylindrical and approaches the size and form of the flow opening of the nozzle, at the same time accelerating the flow through the nozzle by a current emanating from impulse means, which by a reverse movement can be made to cause a momentary suspension of flow through the nozzle, during the interval of exchanging molds for charging. When this reverse movement is not resorted to, and the glass is permitted to issue continuously, its rate of speed is modified by means used to divert the flow from the course it otherwise would take in charging the mold.

As the glass flows from a nozzle, superheated to a degree, preferably higher than the glass flowing therethrough, it passes through a highly superheated atmosphere in the space between the flow opening and the mold port. The port is tapered and of such a size that the flowing glass completely seals it, making effective a suctional action, operative from within the cavity of the mold, and at the same time creates a plastic skin covering to the mass of glass entering the mold, so that the coaction of forces upon the said mass, produce a form thereof, which closely resembles the shape of the cavity of the mold, before the walls thereof are contacted, and thus insures, upon filling said cavity, the simultaneous contacting of all parts of the surface of the mass with the walls of the mold, said walls being cooled. Next, the forcible ejection of the charge of glass from the measuring mold induces internal forces in the charge, which, when free responds to said forces, in a manner to give rounded form to the mass of glass, tending to an equal distribution of heat in the mass, before it enters the shaping mold, for final formative purposes.

There are occasions in which the nature of the glass, the size, shape and number of articles to be formed in a given time will require only a part of the combination of method steps above referred to, without the use of means to divert a continuous flow from the flow opening. We might fill a vacuumized measuring mold from a flow opening, that is closely spaced from a stationary port opening of a mold and enter the glass through the mold port in a manner to seal said port with the inflowing glass, at the same time producing by contacting with the walls of the port, a plastic skin covering to the inflowing glass, so that it will swell in response to the combination of atmospheric, gravity and suctional action to take on a form that will closely resemble the shape of the cavity of the mold, when so designed, before the walls of the mold are contacted. My novel method of filling the mold is important for producing a charge of glass from a flow, that will be free from imprisoned air, and of uniform plastic condition, for further formative purposes. In spacing the measuring mold port from the flow opening, I prevent stagnation and chilling of glass in the flow opening, and am able to insure the full sealing effect of the glass flowing into the measuring mold and thereafter the creation of the plastic skin condition upon the inflowing glass, so that we get the desired swelling effect from the flowing glass, as it enters the mold, similar to blowing a plastic film of glass with air, but in this case the forcing fluid acting upon the plastic film is the inflowing glass itself.

Although there are other methods of utilizing suction for charging a mold, in none, that I know of, is there produced a swelling mass within the mold. To simply exhaust the air within the mold, results only in eliminating the resistance of confined air to the forces of atmospheric pressure, which becomes an impelling force behind the glass to fill the molds. Such a mold would otherwise not become filled by a gravity flow, resisted, as it is, by the absolute plugging of the flow opening with glass congealed from contact with closing and shearing means operated against the flow opening. My method of superheating the glass in the nozzle near the flow opening, as well as surrounding the flowing glass with an atmosphere of burning gases, overcomes objections which make many devices, although patented, absolutely inoperative.

Those skilled in the art of glass manufacture will undoubtedly appreciate the reasons for the various steps in my method above described.

Having thus described my invention, what I claim as new therein, and desire to secure by Letters-Patent, is:

1. The method of feeding glass to and into a receptacle from a melting tank, consisting of flowing molten glass by gravity from a melting tank through a conduit, to and through a flow opening in said conduit, passing the glass by gravity beyond said opening, to and through a receptacle port, spaced from said opening, flowing said glass in section and manner to completely fill said port, while flowing therethrough, and by rarefying the atmosphere within the cavity of said receptacle, which communicates with said port, accelerating the gravity flow of said glass after it has entered said port to fill said receptacle.

2. The method of feeding glass to and into a receptacle from a melting tank, consisting of flowing molten glass from a melting tank through a conduit, to and through a flow opening in said conduit passing the glass by gravity beyond said opening, to and through a receptacle port, closely spaced from said opening, flowing said glass through said port in a manner to overlap the rim thereof while flowing therethrough, to partially support the flowing glass and of accelerating the glass flowing into the cavity of said receptacle, through said port, by rarefying the atmosphere within said cavity, and continuing such flowing action until said receptacle is filled.

3. The method of feeding glass to and into a receptacle from a melting tank, consisting of flowing molten glass from a melting tank, through a conduit to and through a flow opening in said conduit, to and through a receptacle port, closely spaced from said opening flowing said glass through said port in a manner to overlap the rim thereof, while flowing therethrough, to partially support the flowing glass, accelerating the glass flowing into the cavity of said receptacle, through said port, by rarefying the atmosphere within said cavity, continuing such action until said receptacle is filled, ejecting the glass, from said receptacle, continuing the flowing of glass in said flow opening, and repeating the filling of a receptacle in the manner just described, diverting the glass out of the line of flow, from said flow opening, in between the times of consecutive fillings of receptacles and of severing the glass after each filling.

4. The method of feeding glass to and into a receptacle from a melting tank, consisting of flowing molten glass from a melting tank through a conduit and flowing by gravity, vertically to and through a flow opening in said conduit, passing the glass by gravity beyond said opening, to and through a receptacle port closely spaced from said flow opening, flowing said glass through said port, in a manner to overlap the rim thereof, while flowing therethrough to partially support the flowing glass, and accelerating the glass flowing into the cavity of said receptacle, through said port, by rarefying the atmosphere within said cavity and continuing such flowing action until said receptacle is filled.

5. The method of feeding glass to and into a receptacle from a melting tank, consisting of flowing molten glass from a melting tank through a conduit to and through a flow opening in said conduit, passing the glass by gravity beyond said opening to and through a receptacle port closely spaced from said flow opening, flowing said glass by atmospheric pressure and gravity simultaneously, through said opening in said port while removing the atmospheric pressure within said receptacle by rarefying the air therein, during the filling of said receptacle.

6. The method of feeding glass to and into a receptacle from a melting tank, consisting of flowing molten glass from a melting tank through a conduit, passing the glass to and through a flow opening in said conduit, to and through a port in a receptacle in a manner to overlap the rim of said port while flowing therethrough to partially support the flowing glass, flowing said glass through said opening and said port simultaneously under the influence of differential pressure and gravity, to fill said receptacle, said opening and said port being spaced during the passage of glass therebetween.

7. The method of feeding glass to and into a receptacle from a melting tank, consisting of flowing molten glass from a melting tank through a conduit, passing the glass to and through a flow opening in said conduit, to and through a port in a receptacle in a manner to overlap the rim of said port while flowing therethrough to partially support the flowing glass, flowing said glass through said opening and said port simultaneously, and under the influence of differential pressures and gravity to fill said receptacle, said opening and said port being spaced during the passage of glass therebetween, and subsequently after filling the receptacle, severing off connection with the glass in the port, and releasing the glass from the receptacle by a single operation, continuing the flowing of glass in said flow opening and repeating the filling of a receptacle in the manner just described, diverting the glass out of the line of flow from said flow opening in between the times of consecutive fillings of receptacles.

8. The method of feeding glass to and into a receptacle from a melting tank, consisting of flowing molten glass from a melting tank through a conduit, passing said glass from said conduit to and through a nozzle, superheating said nozzle to a degree higher than that of the flowing glass therein, passing the glass by gravity beyond said nozzle into and through a superheated atmosphere and receiving said flowing glass into a receptacle through a port spaced from said nozzle.

9. The method of feeding glass, consisting of flowing molten glass from a nozzle into a series of molds, feeding said molds in succession, continuing the flow of glass in between the times of filling of said molds, retarding this continued flow, and diverting the glass during said continued flow and of severing the glass after the filling of each mold.

10. The method of feeding glass to and into a receptacle from a melting tank, consisting of flowing molten glass from a melting tank through a conduit, passing said glass from said conduit to and through a nozzle, superheating said nozzle to a degree higher than that of the flowing glass therein, passing the glass by gravity beyond said nozzle into and through a burning atmosphere, and receiving said flowing glass through a port into a receptacle in a manner to have said flowing glass overlap the rim of said port to partially support the glass flowing therethrough, said port being spaced from said nozzle.

11. The method of feeding glass to and into a receptacle from a melting tank, consisting of flowing molten glass from a melting tank through a conduit, passing said glass from said conduit to and through a nozzle, superheating said nozzle to a degree higher than that of the flowing glass therein, passing the glass by gravity beyond said nozzle into and through a superheated atmosphere, and receiving said flowing glass through a port, into a receptacle in a manner to have said flowing glass overlap the rim of said port to partially support the glass flowing therethrough, said port being spaced from said nozzle, subsequently separating the glass from said receptacle, continuing the flowing of glass in said flow opening and repeating the filling of a receptacle in the manner just described, diverting the glass out of the line of flow from said flow opening in between the times of consecutive fillings of receptacles and of severing the glass after each filling.

12. The method of feeding glass to and into a receptacle from a melting tank, consisting of flowing molten glass from a melting tank through a conduit, passing said glass from said conduit to and through a nozzle, superheating said nozzle to a degree higher than that of the flowing glass therein, passing said glass beyond said nozzle into and through a superheated atmosphere and receiving said flowing glass through a port into a receptacle, in a manner to have said flowing glass overlap the rim of said port, to partially support the glass flowing therethrough, said port being spaced from said nozzle, flowing said glass through said opening and said port simultaneously, and under the influence of differential pressures and gravity to fill said receptacle, subsequently ejecting the glass from said receptacle, continuing the flowing of glass from said flow opening and repeating the filling of a receptacle in the manner just described, diverting the glass out of the line of flow from said flow opening in between the times of consecutive fillings of receptacles and of severing the glass after each filling.

13. The method of forming a measured quantity of glass, consisting of conducting molten glass from a melting tank to a funnel shaped flow nozzle, flowing said glass through and beyond said nozzle into contact with a separately and closely spaced supporting surface having an opening, passing the flowing glass through said opening in said supporting surface into a measuring receptacle covered by said supporting surface, creating a globular swelling of the glass entering and extending into said receptacle, by making active upon the flowing glass, above said supporting surface and in said nozzle, an accelerating force operating through the glass and co-acting with resistance of the surface tension, attending the cohesive viscosity of the entering glass while suspending from said supporting surface, continuing the swelling of the entering glass until the said measuring receptacle is filled, and thereafter severing off the quantity of glass so formed.

14. The method of feeding glass to a molding receptacle, consisting of flowing molten glass from a superheated nozzle through an enveloping superheating flame into a transmission port, spaced from the flow opening of said nozzle, reducing the sectional area of the flowing stream of glass, as it extends from said nozzle and passes through said transmission port, simultaneously to the effecting of a partial support to the flowing glass passing from said superheated nozzle, producing a plastic skin surface upon the glass from contact with said transmission port, extending the reduced flow of glass below said transmission port, into a mold cavity, which forms an enlarged continuation to said port, removing the atmospheric pressure within said mold cavity, thereby increasing the velocity movement of the central portion of the reduced flow of glass, passing into said mold cavity, simultaneously retarding said central flowing by the surface tension of the plastic layer of the glass extending from said transmission port, swelling and increasing the diametrical volume of the inflowing glass by the co-action of said differential forces, and thereby suspending a growing mass of glass from the confines of said port, to fill said mold cavity, producing a uniformly shaped mass of glass and an instantaneous surface congealing by said action, thereafter severing the glass in said mold cavity from the glass in said port and contacting the severed end of the glass with active air under compression, ejecting the formed mass of glass from the mold cavity into space thus imparting a rounded shape thereto as the said mass leaves said mold to enter a shaping mold.

15. The method of feeding glass to a receptacle, consisting of flowing glass through a channel into a supply chamber terminating in a flow nozzle, flowing said glass through said nozzle by gravity, accelerating the gravity movement of said glass passing through said nozzle by rigid extrusory means operating locally within the body of glass above said nozzle, and producing a thrusting current in said glass directed toward said nozzle, passing said glass, so accelerated, beyond the opening of said nozzle into a receptacle, spaced from said opening, filling said receptacle with said glass, and thereafter reducing the passing of glass through said nozzle and opening, in the interval before feeding a succeeding receptacle, by a resurging flow movement of molten glass in the nozzle and the glass thereabove locally, induced by the reverse movement of said extrusory means.

16. The method of feeding molten glass to a molding receptacle, from a flow opening in a conduit, containing said glass, consisting of flowing said glass through said opening by gravity, accelerating the gravity flow through said opening by a current produced in said glass and directed toward said opening, by impulse means, operating within a portion of the mass of said glass above said opening and out of the path of the actively flowing glass, passing said glass, so accelerated, beyond said opening into a receptacle through a port spaced from said opening, flowing said glass through said port in a manner to overlap the rim thereof for the purpose of partially supporting the glass flowing through said port, rarefying the atmosphere in the cavity of said receptacle, to further accelerate the flow of said glass and filling said receptacle by the continued flow of said glass actuated by differential pressures and subsequently severing off the glass in said receptacle at said port.

17. The method of feeding molten glass from a melting tank to a receptacle consisting of flowing molten glass from a melting tank through a conduit, passing said glass from said conduit to and through a nozzle superheating said nozzle to a degree higher than that of the flowing glass therein, accelerating the gravity flow through said nozzle by a current produced in said glass and directed toward the flow opening of said nozzle, by impulse means operating within a portion of the mass of said glass above said opening and out of the path of the actively flowing glass, passing said glass, so accelerated, beyond said opening into and through a superheated atmosphere to a port of a receptacle in a manner to overlap the rim of said port for the purpose of supporting the glass as it flows therethrough into said receptacle, rarefying the atmosphere within said receptacle to remove the resistance to the inflowing glass, continuing the flowing of glass into said receptacle until the same is filled, severing off the glass filling said receptacle, at said port.

18. The method of feeding molten glass from a melting tank through a conduit, passing said glass from said conduit to and through a nozzle superheating said nozzle to a degree higher than that of the flowing glass therein, accelerating the gravity flow through said nozzle by a current produced in said glass and directed toward the flow opening of said nozzle, by impulse means operating within a portion of the mass of said glass above said opening and out of the path of the actively flowing glass, passing said glass, so accelerated, beyond said opening into and through a superheated atmosphere to a port of a receptacle in a manner to overlap the rim of said port for the purpose of supporting the glass as it flows therethrough into said receptacle, rarefying the atmosphere within said receptacle to remove resistance to the inflowing glass, continuing the flowing of glass into said receptacle until the same is filled, subsequently delivering the glass from said receptacle, continuing the flowing of glass from said nozzle and repeating the filling of a receptacle in the manner just described, diverting the glass out of the line of flow, of said flow opening, in between the times of filling of receptacles, and of severing the glass after each filling.

19. The method of feeding molten glass from a melting tank to a receptacle consisting of flowing molten glass from a melting tank through a conduit, passing said glass from said conduit to and through a nozzle, superheating said nozzle with burning gases, passing said glass beyond said nozzle into and through a superheated atmosphere into a port spaced from said nozzle, flowing the glass through said port into said receptacle, said port being positioned in a surface below said nozzle, said surface being provided with suction holes near said port, drawing said atmosphere down into said suction holes continuously to circulate the said burning gases, and said atmosphere, enveloping said nozzle and said flowing glass, to maintain a sufficient supply of heat units to keep the glass in proper flowing condition while filling said mold and thereafter severing said glass at said port.

20. The method of feeding molten glass from a melting tank to a receptacle consisting of flowing molten glass from a melting tank to and through a nozzle, superheating said nozzle with burning gases, passing said glass beyond said nozzle into and through a superheated atmosphere into a port spaced from said nozzle, flowing the glass through said port into said receptacle, said port being positioned in a surface below said nozzle, said surface being provided with suction holes near said port, drawing said atmosphere down into said suction holes continuously, to circulate the said burning gases and said atmosphere, enveloping said nozzle and said flowing glass, to maintain a sufficient supply of heat units, to keep the glass in proper flowing condition while filling said mold, severing said glass at said port, and subsequently ejecting the glass from said receptacle, continuing the flow of glass from said nozzle and repeating the filling of a receptacle in the manner just described, diverting the glass out of the line of flow of said flow opening in between the times of filling said receptacle, and severing the glass after each filling.

21. The method of feeding glass from a supply nozzle to a receptacle, consisting of superheating a supply nozzle, containing glass, by means of a blowing, enveloping and confined flame, drawing said flame down into suction holes adjoining a port in a surface spaced from the end of said nozzle, so as to form a flowing superheated atmosphere between said nozzle and said port, as well as about the walls of said nozzle, flowing molten glass from said nozzle to and through said port into a receptacle.

22. The method of feeding glass from a flow opening in a supply conduit to a receptacle, and ejecting the glass fed into said receptacle, consisting of flowing molten glass from a supply conduit directly into a receptacle through a port, severing the glass leading into said receptacle, removing the glass with said receptacle from the said port and exposing the severed end surface of glass in said receptacle to an active body of compressed air, while simultaneously opening said receptacle at a point opposite to the said severed end surface, ejecting the said glass into space, from said receptacle, by means of said air applied to the said severed end surface, thereby forming a rounded blank of glass for further formative purposes.

23. The method of producing a volume flow of molten glass from a flow nozzle, consisting of supplying a flow nozzle with molten glass, enveloping said nozzle with a circulating flame, confined between said nozzle and a jacket closely spaced from and surrounding said nozzle, causing said flame to flow out around the flow opening of said nozzle, and of issuing glass from the flow opening in a volume stream, practically cylindrical in form and having a sectional area closely approaching that of said flow opening.

24. The method of feeding glass to a receptacle, consisting of flowing glass through a channel into a supply chamber terminating in a flow nozzle, flowing said glass through said nozzle by gravity, accelerating the gravity movement of said glass passing through said nozzle by rigid extrusory means operating locally within the body of glass above said nozzle, and producing a thrusting current in said glass directed toward said nozzle, passing said glass, so accelerated, beyond the opening of said nozzle into a receptacle, spaced from said opening, filling said receptacle with said glass while under the influence of suction operating in said receptacle, severing off the glass in the receptacle from the glass below the nozzle opening and delivering said glass from said receptacle coincident with said severing action, simultaneously thereto reducing the passing of glass through said nozzle and opening by a resurging flow movement of molten glass in the nozzle, and the glass thereabove locally induced by the reverse movement of said rigid extrusory means, and removing the severed off glass below the nozzle and the reduced flow of glass issuing therefrom in the interval before feeding a succeeding receptacle, to prevent accumulation of glass below the nozzle opening and provide fresh homogeneous molten glass for said succeeding receptacle.

25. The method of feeding glass to a receptacle, consisting in flowing a stream of molten glass from a melting tank through a conduit toward a discharge nozzle, superheating said nozzle and advancing a volume flow of molten glass therethrough, eliminating frictional clinging and congealing of glass in contact with the walls of said nozzle by said superheating and issuing the glass from the delivery opening of said nozzle as an extuberating volume delivering mass of flowing glass, corresponding in lateral dimensions with the diameter of said delivery opening, intensifying the superheating locally at the delivery opening of said nozzle by the circulation in a rapid manner of a combusting atmosphere below and about said opening, passing said flowing glass from said opening through said heat delivering atmosphere to and through an intake port leading into a receptacle, forcing the passing of the glass into said receptacle by a thrusting plunger drive in the glass above said nozzle and simultaneously thereto vacuumizing the interior of the receptacle and inducing an atmospheric pressure grip upon and around the glass as it passes from the nozzle to said port and producing a swelling and instantaneously filling form of molten glass within said receptacle by said coöperating influences, and coincident with said filling of the receptacle reversing the plunger drive in the glass above said nozzle and thereby momentarily reversing the volume flow of molten glass through said nozzle, and reducing the flowing from the delivery opening thereof to a dribbling discharge, and while so actuating the glass in the nozzle, severing off the glass below the delivery opening thereof and within the confines of said port from the glass in the receptacle and removing such glass and the dribbling discharge issuing from said nozzle, transversely from the path of the flowing glass, and removing the glass in the receptacle at the termination of the severing action from the vicinity of said delivery opening.

26. The method of feeding, portioning off and preparing a measured charge of molten glass for formative purposes, consisting of flowing molten glass from a superheated supply nozzle, receiving said glass through a port tapered, convergently, into a measuring mold, while enveloping said port, producing a suspended and radially growing mass of glass, to contact the walls simultaneously and fill the cavity of said measuring mold, shearing said glass at said port, by an eclipsing movement of said mold, across said port, bringing said mold, by said movement, into a closely neighboring position, where opposite sides of said mold become open, one side, that of the sheared end of said glass, contained therein, being brought into direct communication with an active supply of compressed air, while the opposite side is freely open, whereby the measured charge of glass is ejected into space, to provide an instant, wherein the internal resultant stresses, in the said charge of glass, are free to form a rounded mass thereof and to distribute heat units, prior to catching the ejected charge of glass in a forming mold.

27. The method of feeding glass, consisting in continuously flowing molten glass by gravity from a feed nozzle to receiving and measuring means, varying the velocity of said gravity flow, during its continuous flowing to said means, portioning off measured quantities of said glass in said means and delivering said measured quantities to molds.

28. The method of feeding glass, consisting of conducting molten glass through and from a conduit to an intake port, spaced from said conduit and opening into a preliminary former, drawing the fluid from said port into the preliminary former by suction, delivering a cooling blast around said former, and delivering the preliminarily shaped glass to a mold.

29. The method of charging a molding receptacle, consisting of flowing glass from a supply thereof to and through a nozzle, heated to a temperature higher in degree than the flowing glass, of receiving the glass issuing from the said nozzle into a mold port, spaced from the flow opening of said nozzle, reducing the flowing stream of glass by contact with the walls of said port, as it passes into the mold in a manner to completely seal the said port and make plastic the surface of said stream, as it enters the cavity of said mold and of effecting the inflowing glass by suctional action, operative from within the mold, in a manner to produce a swelling to the inflowing glass, before it contacts the inner wall of the cavity of the mold.

30. The method of feeding glass from a melting tank to a molding receptacle, consisting of flowing glass from said melting tank, through a conduit to a flow opening, of flowing said glass by gravity from said flow opening to a molding receptacle, spaced from and adjacent thereto, of severing the glass at said receptacle beyond said flow opening, removing glass chilled by said severing action and exposing actively flowing molten glass to feed a succeeding molding receptacle.

31. The method of feeding glass from a melting tank to a hollow receiver, consisting of flowing molten glass from a melting tank through a conduit to a nozzle, superheating said nozzle by direct contact with a blast actuated flame, enveloping said nozzle and heating said nozzle to a temperature higher in degree than the glass passing therethrough, and of flowing said glass by gravity to a hollow receiver, closely spaced from said nozzle.

32. The method of feeding glass, consisting in intermittently delivering a mass quantity of molten glass from a heated delivery nipple to a measuring element spaced from said nipple, passing said delivering glass through a port in said measuring element into a measuring cylinder associated therewith, filling the interior of said cylinder with a body form of glass from said mass delivering glass entering therein, coincident with said filling, severing off the glass in said cylinder from the glass in the port leading thereinto, and terminating said severing action by advancing the severed end of the glass in said cylinder unto an active air compression and simultaneously thereto removing the glass in the bottom portion of said receptacle from chilling contact with the bottom surface associated with the cylinder, and freely exposing the lower end of said glass to the surrounding atmosphere, instantaneously thereto applying an elastic force impact of compressed air upon the upper severed end of the glass in said cylinder, and injecting the glass from said cylinder and imparting a rounded body form thereto by said elastic impact, providing an instant wherein the interior heat of said rounded blank body of glass may distribute uniformly to all portions of the exterior of said body.

33. The method of feeding glass through a melting tank to a hollow receiver, consisting of flowing molten glass from a melting tank, through a conduit to a flow opening, flowing glass by gravity from said flow opening to a hollow receiver, closely spaced therefrom and of varying the flow from said opening into said receiver, by a rigid forcing and regurgitating medium, operative upon the flowing glass at a point removed from the glass in the flow-opening and within the lower portion of the body of the glass in said conduit.

34. The method of feeding glass into a receptacle consisting of extending, by gravity, a protuberance of molten glass beyond a flow opening, contacting said protuberance with the walls of an intake port to a receptacle, spaced from said flow opening and then extending the glass in said port, into said receptacle, by the combined action of the gravity movement of the glass and suctional activity, active from within the receptacle.

35. The method of feeding glass from a melting tank into a hollow receptacle consisting of flowing molten glass from a melting tank through a conduit to a flow opening by gravity, by flowing glass from said flow opening to a hollow receiver, spaced therefrom, of shearing the glass connecting that in said flow opening with that in said receiver, at a point away from said flow opening, of modifying the gravity flow by rigid forcing means locally active within a separated and restricted area in the body of glass in said conduit.

36. The method of feeding glass, consisting of flowing glass vertically by gravity to and through a flow opening to a receiver, spaced from said flow opening and of assisting the glass flowing into said receiver, by suctional action.

37. The method of feeding glass to a hollow receiver, consisting of flowing molten glass from a melting tank, through a conduit, to a flow opening in said conduit, of flowing said glass by gravity, from said flow opening to a hollow receiver through a funnel shaped port spaced from said flow opening and of accelerating such flowing glass from said flow opening, by suctional action.

38. The method of feeding glass to a molding receptacle from a flow opening, consisting of flowing glass into said receptacle, by gravity, accelerated by a mechanical impulse, and of assisting such flowing glass within said receptacle by rarefying the atmosphere within said receptacle with suctional action.

39. The method of feeding glass to a molding receptacle from a flow opening, consisting of flowing glass by gravity, accelerated by a mechanical impulse, into a receiver, spaced from said flow opening, and of assisting such flowing glass to fill said receiver, by suctional action operative therein.

40. The method of flowing glass from a flow opening through a space to a molding receptacle, consisting of flowing glass by gravity to said spaced receptacle, accelerating the gravity flow by a current mechanically produced at a point in the glass back of said flow opening and spaced therefrom, and of further accelerating the glass flowing within said receptacle, by a suctional action, operative therein.

41. The method of feeding glass, consisting of flowing glass by gravity beyond a flow opening to a receiver, and of assisting such gravity flow by the action of ejecting means, to partially fill said receiver and subsequently filling said receiver by suctional action from within said receiver.

42. The method of feeding glass to molds which consists in successively forcing and passing predetermined mass quantities of molten glass from a heated glass delivering medium, to a series of molds successively alined in spaced receiving position beneath said heated glass delivering medium, filling each of said molds with a mass quantity of glass, in an instantaneous manner, and successively diverting and decreasing the passing of glass from said heated medium in between the successive delivering of glass to said molds, and approximately simultaneously therewith severing the glass in said molds, from the glass in said delivering medium, without imparting detrimental congealing to the glass therein.

43. The method of feeding glass from a melting tank to a hollow receiver, consisting of flowing molten glass from a melting tank through a conduit to a flow nozzle, flowing said glass by gravity from said flow nozzle to a hollow receiver closely spaced therefrom and varying the flowing from said nozzle by a rigid forcing and regurgitating medium in the body of glass above said nozzle and below the surface of said body, and by suctional activity within the hollow receiver.

44. The method of feeding glass, consisting of continuously delivering molten glass from a melting tank to a superheated outlet, measuring the glass as it is delivered from the superheated outlet by the aid of suction in a receiving element, which is out of contact with said superheated outlet, and delivering the measured quantities of glass to a mold.

45. The method of feeding glass, consisting of conducting molten glass through a conduit and a superheated flow opening to a measuring cup by gravity, filling said cup and disjoining the glass therein from the glass conducting from said opening and delivering the measured glass from said cup into a shaping mold, accomplishing said superheating by direct flame, in contact with said flow opening and surrounding the same, and accomplishing said disjoining and delivering at a point adjacent to, but out of coadjuvant association with said superheated flow opening.

46. The method of feeding glass, consisting of delivering molten glass through a superheated outlet and a burning atmosphere, to a measuring element, passing a cooling blast around the measuring element, within the walls thereof, and of delivering material from the measuring element to a mold.

47. The method of feeding glass, consisting of conducting molten glass through a conduit to an opening, superheating said opening by the rapid circulating of a burning flame around it, drawing molten glass from said opening to a measuring element by suction, assisted by delivering gravity movement of molten glass from said orifice toward said measuring element, and delivering said glass from the measuring element to a mold.

48. The method of feeding glass to a molding receptacle from a nozzle, consisting of flowing molten glass from a nozzle superheated to a higher degree than that of the flowing glass, of enveloping said flowing glass by a superheated atmosphere, of receiving said flowing glass through a mold port, having walls adapted to support said glass and spaced from the flow opening of said nozzle and said confining mold port being smaller in sectional area than the stream of glass passing from said superheated nozzle, flowing said glass through said mold port, into the cavity of a receptacle beneath said mold port while sealing said port, and making plastic the surface of the inflowing stream of glass by contact with the confining walls of said port and by differential pressures of swelling the inflowing glass within the cavity of the mold before contact with the walls of said cavity, and while being suspended from the supporting walls of said mold port.

49. The method of feeding glass to molds, which consists in successively extending, by intermittent force actuation, mass quantities of glass from the heated lips of a discharge orifice, contacting the said extended glass with the divergent sides of intake ports, of measuring molds, successively arranged in receiving position, beneath said discharge orifice, and out of contact therewith, and removing the atmospheric resistance, in said measuring molds, to the entry of said force-actuated glass into said molds, by suction within the molding cavities, and successively filling said molds with accurately measured quantities of glass in an instantaneous manner, and successively severing, and delivering said quantities of glass from said measuring molds to successive shaping molds.

In testimony whereof I affix my signature in presence of two witnesses.

ENOCH TH. FERNGREN.

Witnesses:
H. C. DENNISON,
DONALD McKAIG.